United States Patent [19]
Tateishi et al.

[11] Patent Number: 5,643,690
[45] Date of Patent: Jul. 1, 1997

[54] MOLTEN CARBONATE FUEL CELL

[75] Inventors: Hiroshi Tateishi, Yokohama; Norihiro Tomimatsu; Kazuaki Nakagawa, both of Kawasaki; Hideyuki Ozu; Yoshihiro Akasaka, both of Yokahama, all of Japan

[73] Assignee: Kabushiki Kaisha Toshiba, Kawasaki, Japan

[21] Appl. No.: 555,080

[22] Filed: Nov. 8, 1995

[30] Foreign Application Priority Data

Nov. 11, 1994 [JP] Japan ................................. 6-277439
Jul. 20, 1995 [JP] Japan ................................. 7-184287

[51] Int. Cl.$^6$ ................................................. H01M 8/14
[52] U.S. Cl. ........................... 429/34; 429/41; 429/44
[58] Field of Search ............................ 429/30, 33, 34, 429/35, 129, 142, 41

[56] References Cited

U.S. PATENT DOCUMENTS

| | | | |
|---|---|---|---|
| 4,404,267 | 9/1983 | Iacovangelo et al. | 429/41 |
| 4,548,876 | 10/1985 | Bregoli | 429/39 |
| 4,702,973 | 10/1987 | Marianowski | 429/41 |
| 4,755,376 | 7/1988 | Marianowski | 429/16 |
| 5,114,810 | 5/1992 | Frysz et al. | 429/194 |

FOREIGN PATENT DOCUMENTS

| | | |
|---|---|---|
| 3-20968 | 1/1991 | Japan . |
| 7-183038 | 7/1995 | Japan . |
| 7-254424 | 10/1995 | Japan . |

OTHER PUBLICATIONS

No. 13 Conference of Institute of Energy and Resources, Kouichi Takizawa, Shouji Murai (Tepco), Kiyokazu Nakagawa (IHZ), Apr. 13, 1994.

*Primary Examiner*—M. Nuzzolillo
*Attorney, Agent, or Firm*—Oblon, Spivak, McClelland, Maier & Neustadt, P.C

[57] ABSTRACT

There is proposed a molten carbonate fuel cell of high performance and long life which is provided with an oxidizing gas side-collector plate having on its surface a non-stoichiometric composite oxide layer excellent in electric conductivity and corrosion resistance, and hardly attracting electrolyte. This molter carbonate fuel cell comprises a unit cell comprising an electrolyte body formed of a porous body impregnated therein with a carbonate, a cathode disposed on one main surface of the electrolyte body, and an anode disposed on the other main surface of the electrolyte body, corrugated collector plates, disposed alternatively on a surface of the anode and on a surface of the cathode, and interconnectors, each being disposed on a surface of each of the collector plates, wherein the collector plate disposed on the cathode comprises a main body made of austenitic stainless steel, an Fe-Cr-Ni alloy layer covering a surface of the main body and consisting of 23 to 45 wt % of Fe, 12 to 27 wt % of Cr, the balance of Ni and not more than 1 wt % of unavoidable impurities, and a nickel-ferrite-based non-stoichiometric composite oxide layer formed on a surface of the Fe-Cr-Ni alloy layer.

21 Claims, 2 Drawing Sheets

MOLTEN CARBONATE FUEL CELL

BACKGROUND OF THE INVENTION

1. Field of the Invention

This invention relates to a molten carbonate fuel cell, and in particular to a molten carbonate fuel cell having an improved collector plate.

2. Description of the Related Art

Various kinds of fuel cells have been proposed and commercially utilized. Among them, a molten carbonate fuel cell is now extensively studied and being developed because it is advantageous in power generation efficiency as well as it is capable of utilizing coal gas as a fuel gas.

This molten carbonate fuel cell is constructed such that a plurality of unit cell, each comprising an anode (a fuel electrode), a cathode (an air electrode) and an electrolyte body, are superimposed one upon another with a collector plate being interposed between the unit cells, and an interconnector is interposed between the collector plates to partition the unit cells. There is also disposed in the fuel cell a couple of edge-sealing plates for holding therebetween the peripheral portion of the electrolyte body. Thus, these edge-sealing plates are contacted to the peripheral portion of the electrolyte body so as to form a wet seal and to shield the unit cell from the outer atmosphere.

By the way, the collector plate disposed on the oxidizing gas-side is rendered to be covered with a film of highly corrosive molten carbonate solution which has been exuded from the air electrode during the operation of the fuel cell. Because of this, the collector plate is conventionally formed of stainless steel having an excellent corrosion resistance. The stainless steel conventionally employed is mainly SUS310S and SUS316L.

However, the collector plate formed of stainless steel is accompanied with a problem that a corrosion product containing corroded iron is deposited as a lamina on the surface of the collector plate during the operation of the fuel cell. In particular, when the fuel cell is operated for a long period of time extending over 1,000 hours, the deposition of corrosion product is grown up increasing the electric resistance thereof, thus extremely deteriorating the performance of the fuel cell. Namely, the deposition of the corrosion product on the collector plate deteriorates the performance and life of a fuel cell.

Japanese Patent Unexamined Publication No. 5-324460 discloses a stainless steel collector plate provided on the surface thereof with a NiO layer. According to this collector plate, the Ni layer is oxidized within a fuel cell thus forming a NiO layer, thereby preventing the deposition of a corrosive layer of high electric resistance, hence suppressing any increase in electric resistance. However, since the NiO layer of the collector plate is porous and attracts a large amount of electrolyte, the electrolyte-retention quantity within the unit cell may become insufficient thus possibly deteriorating the performance of the fuel cell. Moreover, a collector plate made of stainless steel or NiO-covered stainless steel may be deformed due to the influence of temperature distribution resulting from a difference in cooling rate of collector plate during cooling of thereof after power generation, hence the surface of the collector plate contacting with the cathode is peeled off thus spoiling the adhesion between the cathode and the collector plate. As a result, it is most probable that a molten carbonate fuel cell provided with a collector plate made of stainless steel or NiO-covered stainless steel may be suffering from deterioration in performance when it is subjected to a heat cycle wherein the temperature of collector plate is repeatedly raised or lowered.

SUMMARY OF THE INVENTION

Accordingly, an object of the present invention is to provide a molten carbonate fuel cell of high performance and long life which is provided with an oxidizing gas-side collector plate having on its surface a non-stoichiometric composite oxide layer which is excellent in electric conductivity and corrosion resistance, and hardly attracts electrolyte, resulting in that the collector plate can be hardly peeled off from a cathode even if the collector plate is subjected to a heat cycle of raising or lowering the temperature of collector plate.

Another object of this invention is to provide a molten carbonate fuel cell of long life and lower electric resistance which is capable of preventing the corrosion of a contacting portion between the oxidizing gas-side collector plate and an interconnector.

Another object of this invention is to provide a molten carbonate fuel cell provided with a collector plate which can be hardly peeled off from a cathode or an anode even if the collector plate is operated for a long period of time extending over 10,000 hours.

Namely, according to the present invention, there is provided a molten carbonate fuel cell which comprises;

a unit cell comprising an electrolyte body formed of a porous body impregnated therein with a carbonate, a cathode disposed on one main surface of the electrolyte body, and an anode disposed on the other main surface of the electrolyte body;

corrugated collector plates, disposed alternatively on a surface of the anode and on a surface of the cathode; and interconnectors, each being disposed on a surface of each of the collector plates;

wherein the collector plate disposed on the cathode comprises a main body made of austenitic stainless steel; an Fe-Cr-Ni alloy layer covering a surface of the main body and comprising 23 to 45 wt % of Fe, 12 to 27 wt % of Cr, the balance of Ni and not more than 1 wt % of unavoidable impurities; and a nickel-ferrite-based non-stoichiometric composite oxide layer formed on a surface of the Fe-Cr-Ni alloy layer.

According to the present invention, there is further provided a molten carbonate fuel cell which comprises;

a unit cell comprising an electrolyte body formed of a porous body impregnated therein with a carbonate, a cathode disposed on one main surface of the electrolyte body, and an anode disposed on the other main surface of the electrolyte body;

corrugated collector plates, disposed alternatively on a surface of the anode and on a surface of the cathode; and interconnectors, each being disposed on a surface of each of the collector plates;

wherein each collector plate disposed on the cathode contacts at portions a flat surface of the interconnector, each of the portion having curved surfaces at ends, and a barrier is filled in spaces formed between the flat surface of the interconnector and the curved surfaces of each portion of the collector plate.

According to the present invention, there is further provided a molten carbonate fuel cell which comprises;

a unit cell comprising an electrolyte body formed of a porous body impregnated therein with a carbonate, and a pair of electrodes disposed respectively on the both main surfaces of the electrolyte body;

corrugated collector plates, disposed alternatively on a surface of one electrode and a surface of another electrode; and interconnectors, each being disposed on a surface of each of the collector plates;

wherein each of the corrugated collector plates has a first surface contacting the electrode and a second surface contacting the interconnector, the first surface is broader than the second surface, has a plurality of gas-feeding through holes and is arcuate toward the electrode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENTS

This invention will be further explained in detail with reference to FIG. 1.

Figure 1:
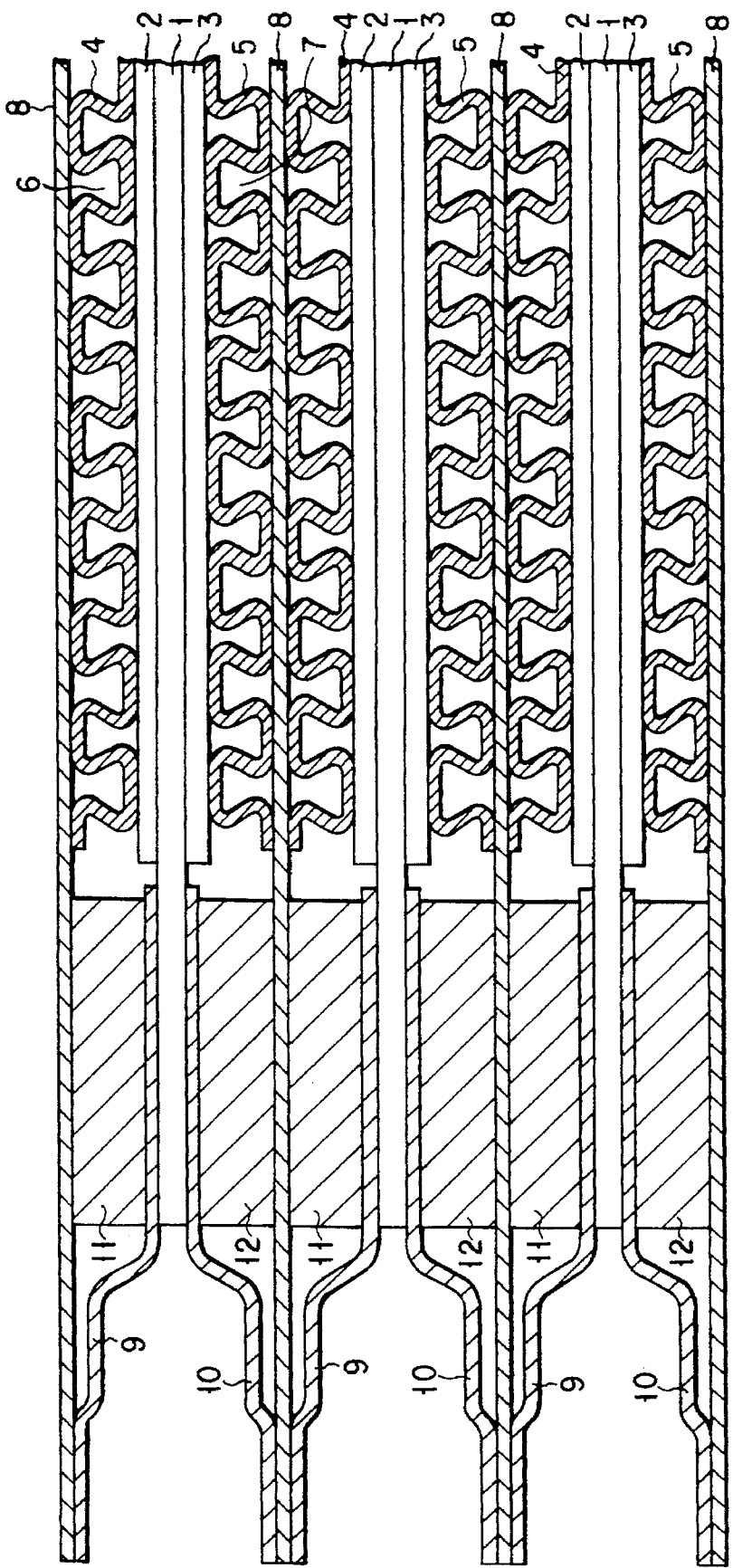
FIG. 1 is a cross-sectional view showing one embodiment of the molten carbonate fuel cell according to the present invention.

FIG. 1 is a cross-sectional view showing a portion of laminated cell comprising a plurality of unit cells superimposed one upon another. An electrolyte body 1 is interposed between an anode (a fuel electrode) 2 and a cathode (an air electrode) 3. This electrolyte body 1 is formed of a porous body impregnated therein with an electrolyte including at least a carbonate such as lithium carbonate. One unit cell is constituted by these electrolyte body 1, an anode 2 and a cathode 3. A corrugated collector plate 4 disposed on the fuel gas side and a corrugated collector plate 5 disposed on the oxidizing gas side are placed respectively on a surface of the anode 2 and a surface of the cathode 3 which are opposite to the surfaces where the electrolyte body 1 is contacted with. In the portions of the collector plates 4 and 5 where the anode 2 and the cathode 3 are contacted with, there are formed a plurality of gas-feeding through-holes (not shown). Fuel gas is allowed to pass through a fluid passage 6 formed between the anode 2 and the collector plate 4. On the other hand, an oxidizing gas is allowed to pass through a fluid passage 7 formed between the cathode 3 and the collector plate 5. A separator is disposed between the neighboring unit cells, thus functioning as a partitioning member for separating one unit cell from another. This separator is constituted by an interconnector 8 which separates the fluid passage 6 from the fluid passage 7, and a couple of edge-sealing plates 9 and 10 disposed in such a manner as to hold therebetween a peripheral portion of the electrolyte body 1. These edge-sealing plates 9 and 10 are contacted with a peripheral portion of the electrolyte body 1, forming a wet seal which functions to shield the power-generating parts of the unit cell from the outer atmosphere. Further, these edge-sealing plates 9 and 10 are pressed toward each other at a bearing pressure of 5 kg/cm$^2$ or less in general by a pair of springs 11 and 12 disposed at their holding portions, i.e. portions holding the peripheral portion of the electrolyte body 1, thereby ensuring the wet seal mentioned above.

As a specific example of the electrolyte body 1, a porous body comprising mainly of lithium aluminate (LiAlO$_2$) and being impregnated with an electrolyte in a molten state may be used. In this case, a mixed alkali carbonate such as a mixture of lithium carbonate (Li$_2$CO$_3$) and potassium carbonate (K$_2$CO$_3$), a mixture of lithium carbonate (Li$_2$CO$_3$) and sodium carbonate (Na$_2$CO$_3$), or a mixture of lithium carbonate (Li$_2$CO$_3$), potassium carbonate (K$_2$CO$_3$) and sodium carbonate (Na$_2$CO$_3$) may be employed as an electrolyte. It is also possible to further mix an alkaline earth carbonate into a mixture of alkali carbonate as an electrolyte.

Each of the anode 2 and the cathode 3, a porous body is made of a sintered body of nickel-based alloy.

Each of the interconnector 8 and a couple of edge-sealing plates 9 and 10 is made of stainless steel.

As for the fuel gas, a mixed gas consisting of hydrogen (H$_2$) and carbon dioxide (CO$_2$) may be used. As for the oxidizer gas, a mixed gas consisting of air or oxygen (O$_2$) and carbon dioxide (CO$_2$) may be used.

In the followings, (1) the construction of the oxidizing gas-side collector plate, (2) the structure of the contacting portion between the collector plate and the interconnector, and (3) the structure of the collector plate will be explained.

(1) the construction of the oxidizing gas-side collector plate:

The oxidizing gas-side collector plate 5 comprises of a main body made of austenitic stainless steel; an Fe-Cr-Ni alloy layer covering at least a portion of the surface of the main body which contacts with the cathode and consisting of 23 to 45 wt % of Fe, 12 to 27 wt % of Cr, the balance of Ni and not more than 1 wt % of unavoidable impurities; and a nickel-ferrite-based non-stoichiometric composite oxide layer formed on the surface of the Fe-Cr-Ni alloy layer.

The stainless steel constituting the main body of the collector plate consists of 10 to 27 wt % of Cr, 7.0 to 28 wt % of Ni, not more than 0.08 wt % of Co, not more than 2.0 wt % of Mn, not more than 1.5 wt % of Si, the balance of Fe and not more than 1 wt % of unavoidable impurities. Examples of such a stainless steel are SUS310S and SUS316L both being excellent in high temperature strength and corrosion resistance.

The main body of the collector plate may preferably be manufactured from a stainless steel sheet having a thickness of 200 to 400 μm. A collector plate having such a main body exhibits an excellent high temperature strength and corrosion resistance as it is fabricated in a fuel cell.

The Fe-Cr-Ni alloy layer is required to be formed at least on a surface portion of the main body of the collector plate which contacts with the cathode. This is because the surface portion of the collector plate which contacts with the cathode is most liable to allow the growth of corrosion products containing iron having a high electric resistance, thereby deteriorating the performance and life of a cell. Therefore, it is desirable to form the above-mentioned alloy on this surface portion of the collector plate and then to form the above-mentioned non-stoichiometric composite oxide layer which is excellent in electric conductivity and corrosion resistance on the surface of the alloy for the prevention of the growth of corrosion products containing iron. It is of course possible to form the Fe-Cr-Ni alloy layer all over the whole surface of the main body of the collector plate which faces to the cathode, or all over the both surfaces of the main body of the collector plate.

The reasons for limiting the contents of Fe and Cr in the Fe-Cr-Ni alloy layer are as follows.

(a) Fe

If the content of Fe is less than 23 wt %, a porous NiO layer may be caused to be formed pulling an increasing amount of electrolyte, thus deteriorating the performance of the fuel cell. On the other hand, if the content of Fe exceeds over 45 wt %, a composite oxide layer having a high electric resistance is more likely to be formed on the surface of the alloy layer. A preferable range of the Fe content is 28 to 42 wt %.

(b) Cr

If the content of Cr is less than 12 wt %, the corrosion resistance of the composite oxide layer formed on the surface of the alloy layer may be deteriorated. On the other hand, if the content of Cr exceeds over 27 wt %, the workability of the alloy may be deteriorated. A preferable range of the Cr content is 19 to 27 wt %.

This Fe-Cr-Ni alloy layer can be formed on the surface of the main body of the collector plate by way of a cladding method for example. The thickness of this Fe-Cr-Ni alloy layer may preferably be in the range of 15 to 150 μm, more preferably 50 to 100 μm. If the thickness of this Fe-Cr-Ni alloy is less than 15 μm, the effect of suppressing the deformation of the collector plate may be reduced. On the other hand, if the thickness of the Fe-Cr-Ni alloy exceeds over 150 μm, an internal stress due to the difference in thermal expansion coefficient between the austenitic stainless steel main body of the collector plate and the alloy layer may become so large that the cathode may be collapsed due to the increased pressing force against the cathode.

The nickel-ferrite-based non-stoichiometric composite oxide layer is made of a composition wherein the amounts of Ni and Fe are stoichiometrically insufficient for the amount of oxygen as compared with a composite oxide material having the stoichiometric composition of $NiFe_2O_4$. Preferably, this non-stoichiometric composite oxide layer should be represented by a general formula of $Ni_{1-x}Fe_{2-y}O_4$ (wherein x is in the range of $0<x<0.85$ and y is in the range of $-0.5<y<1.0$ and x+y is in the range of $0<x+y$). Once the collector plate is fabricated into a fuel cell and electric power is generated, this non-stoichiometric composite oxide layer no more indicates a constant composition ratio, but exhibits varied composition ratios depending on the site in the surface of the collector plate. The non-stoichiometric composite oxide layer may be the one which is interpenetrated or substituted by Li. However, in any case, the oxide should be the one having a spinel structure as measured by way of X-ray diffraction.

The non-stoichiometric composite oxide layer should preferably be capable of retaining a thickness of 50 μm or less after a fuel cell provided with this composite oxide layer is subjected to an operation of 1,000 hours. The thinner the thickness of the non-stoichiometric composite oxide layer is, the smaller the value of electric resistance of the collector plate becomes, thus making it more desirable. If the thickness of the non-stoichiometric composite oxide layer exceeds over 50 μm, the quantity of electrolyte pulled by the oxide layer due to its porosity becomes too large, thus deteriorating the performance of the cell.

This non-stoichiometric composite oxide layer can be formed by the following methods.

(a) The collector plate (which comprises a stainless steel main body and an Fe-Cr-Ni alloy layer formed on the surface of the main body) is subjected to a high temperature oxidizing treatment prior to the assembling thereof into the fuel cell, thus forming a non-stoichiometric composite oxide layer on the surface of the alloy layer.

(b) The collector plate (which comprises a stainless steel main body and an Fe-Cr-Ni alloy layer formed on the surface of the main body) is fabricated into the fuel cell, and then subjected to the operation of the cell, whereby allowing a non-stoichiometric composite oxide layer to be formed on the surface of the alloy layer during the operation.

When a fuel cell mounting the collector plates thereon is subjected to an operation of about 1,000 hours according to the method of (b) mentioned above, a non-stoichiometric composite oxide layer 5 to 20 μm in thickness can be formed on the surface of the alloy layer.

The nickel-ferrite-based non-stoichiometric composite oxide layer may be formed of a laminate structure wherein two or more of the composite oxide layers having different composition ratios from each other are superimposed on the surface of the alloy layer. For example, a laminate structure consisting of an oxide layer containing Fe and Cr, and a composite oxide layer having an insufficient amount of Ni and Fe in relative to the amount of oxygen as compared with a composite oxide material having the stoichiometric composition of $NiFe_2O_4$, which are superimposed in the mentioned order, may be formed on the surface of the alloy layer.

The oxidizing gas-side collector plate comprises, as mentioned above, a main body made of austenitic stainless steel; an Fe-Cr-Ni alloy layer covering at least a portion of the surface of the main body which contacts with the cathode and consisting of 23 to 45 wt % of Fe, 12 to 27 wt % of Cr, the balance of Ni and not more than 1 wt % of unavoidable impurities; and a nickel-ferrite-based non-stoichiometric composite oxide layer formed on the surface of the Fe-Cr-Ni alloy layer. The non-stoichiometric composite oxide layer is excellent in conductivity, pulls in only a little amount of electrolyte, and has an excellent corrosion resistance. With this structure explained above, it is possible to press the collector plate against the cathode by the effect of an internal stress generating from a difference in thermal expansion coefficient between the austenitic stainless steel main body of the collector plate and the Fe-Cr-Ni alloy layer during the descending of temperature after the power generation of a fuel cell provided with the above-mentioned collector plate, so that the collector plate can be effectively adhered onto the anode. Therefore, it is possible, with this molten carbonate fuel cell provided with such an oxidizing gas-side collector plate, to achieve an improvement in performance and the elongation of life.

Figure 2:
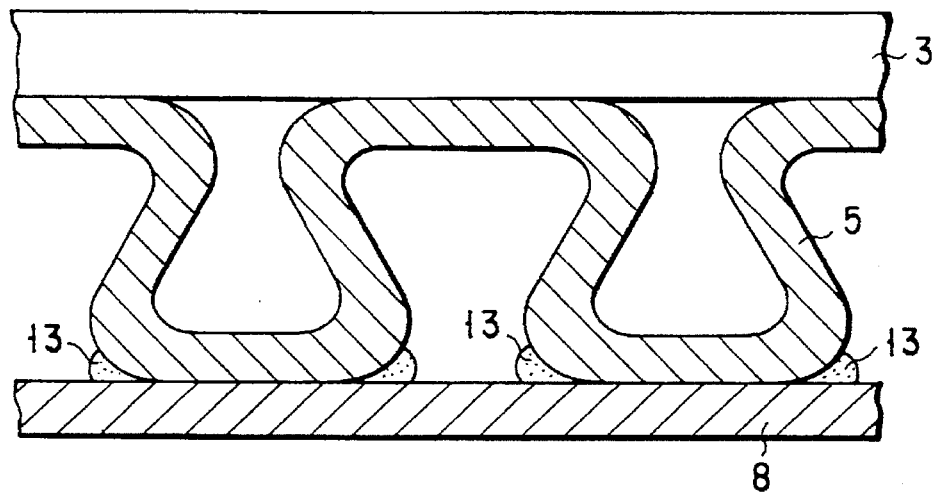
FIG. 2 is a cross-sectional view showing a barrier material disposed at a portion of an oxidizing gas-side collector plate contacting with an interconnector.

(2) The structure of a contacting portion between a collector plate and an interconnector:

As shown in FIG. 2, each collector plate 5 disposed on the cathode 3 contacts at portions a flat surface of the interconnector 8, each of the portions having convex surfaces at ends. A barrier 13 is filled in spaces formed between the flat surface of the interconnector 8 and the convex surface of each portions of the collector plate 5. When the barrier 13 is filled in this manner, it is possible to prevent the electrolyte exuded from the cathode 3 from being pulled into the space, and at the same time to prevent the decrease in contacting area between the collector plate 5 and the interconnector 8 due to the growth of a high resistant corrosion layer into the inner portion of the contacting area, thereby suppressing the increase in electric resistance of this portion.

The collector plate may be formed of a stainless steel having a composition consisting of 10 to 27 wt % of Cr, 7.0 to 28 wt % of Ni, not more than 0.08 wt % of Co, not more than 2.0 wt % of Mn, not more than 1.5 wt % of Si, the balance of Fe and not more than 1 wt % of unavoidable impurities. Examples of such a stainless steel are SUS310S and SUS316L both being excellent in high temperature strength and corrosion resistance.

The barrier may be made of the following conductive materials having a low melting point.

(a) The barrier may be made of a conductive material having a melting point lower than the operating temperature of the fuel cell, e.g., an aluminum solder or a silver solder. When such a barrier 13 as having a melting point lower than the operating temperature of the fuel cell is filled in spaces formed between the oxidizing gas-side collector plate 5 and the interconnector 8, the barrier is caused to melt as a result of the actuation of the fuel cell, and the resultant molten barrier is pulled in an inner portion of the gap through a capillary action whereby filling the gap entirely. Accordingly, it is possible, with the provision of this barrier, to flexibly cope with any deformation of the collector plate.

(b) The barrier may be made of a conductive material having a melting point lower than the melting point of an electrolyte, e.g., a gold solder. When the barrier 13 having such a low melting point is filled in spaces formed between the oxidizing gas-side collector plate 5 and the interconnector 8, the barrier 13 is caused to melt before the electrolyte begins to melt and exudes out into the gap during the operation of the fuel cell, thus causing the resultant molten barrier to fill in an inner portion of the gap. Accordingly, it is possible to reliably prevent the corrosion layer of high resistance from being formed at the contacting portion.

Next, a method of filling the barrier in the spaces between the collector plate and the interconnector will be explained as follows.

(a) When a barrier having a melting point higher than the operating temperature of the fuel cell is to be employed:

First of all, a collector plate is superimposed on an interconnector, and then a load of 2 kg/cm$^2$ is applied on the resultant laminate. Then, a gold solder wire for example is placed at spaces formed between the convex surface of each portion of the collector plate and the flat surface of the interconnector, and then heat-treated at a temperature of 910° C. for 10 minutes to fill the gold solder in the spaces. Subsequently, the laminate consisting of the collector plate and the interconnector is fabricated into the fuel cell.

(b) When a barrier having a melting point lower than the operating temperature of the fuel cell is to be employed:

First of all, an Al-Si solder wire for example is placed at spaces formed between the convex surface of each portion of the collector plate and the flat surface of the interconnector, and then the collector plate and interconnector are fabricated together with other parts into the fuel cell. Then, the fuel cell is actuated melting the Al-Si solder wire and filling the Al-Si solder in the gap through a capillary action.

(c) When a barrier having a melting point lower than the melting point of an electrolyte is to be employed:

First of all, a gold solder for example is placed at spaces formed between the convex surface of each portion of the collector plate and the flat surface of the interconnector, and then the collector plate and interconnector are fabricated together with other parts into the fuel cell. Then, the fuel cell is actuated to melt the gold solder at a temperature of 300° C. or so before the electrolyte is caused to melt, thus filling the gold solder in the gap through a capillary action.

As for the solder or wax to be employed in the filling of the barrier in the above methods of (a) to (c), they can be employed in any form, i.e. wire, bar, sheet powder or paste.

The barrier is desirably made of a conductive material as mentioned above, but may be made of an insulating material such as a low melting-point glass. This low melting-point glass may be filled into the above-mentioned spaces in the following manner.

First of all, ZnO—$B_2O_3$ powder for example is placed at spaces formed between the convex surface of each portion of the collector plate and the flat surface of the interconnector, and then the collector plate and interconnector are fabricated together with other parts into the fuel cell. The fuel cell is then actuated melting the ZnO—$B_2O_3$ powder at a temperature of 600° C., thus filling the ZnO—$B_2O_3$ powder in the spaces through a capillary action.

As explained above, by filling a barrier material in the spaces formed between the convex surface of each portion of the collector plate and the flat surface of the interconnector, the pulling or attracting of an electrolyte into the spaces can be effectively prevented. As a result, the corrosion of the contacting portion between the oxidizing gas-side collector plate and the interconnector can be prevented, thus making it possible to maintain the initial contact area (the initial state when the cell is fabricated). As a result, any increase in electric resistance between the collector plate and the interconnector can be suppressed thus achieving the manufacture of a molten carbonate fuel cell of long life.

Moreover, by employing a barrier material (in particular, a conductive material) having a melting point lower than the operating temperature of the fuel cell, it has become possible to conveniently fill the barrier material during the operation of the fuel cell into the spaces formed between the oxidizing gas-side collector plate and the interconnector which have been deformed due to the operation of the fuel cell, the barrier thus filled being spreading following the shape of the spaces. In other words, even if the fuel cell is subjected to heat cycle, the barrier can be conveniently filled in the spaces to be formed between the convex surface of each portion of the collector plate and the flat surface of the interconnector. As a result, the corrosion of the contacting portion between the oxidizing gas-side collector plate and the interconnector can be reliably prevented, thus making it possible to maintain the initial contact area (the initial state when the cell is fabricated), resulting in that any increase in electric resistance between the collector plate and the interconnector can be suppressed thus realizing the manufacture of a molten carbonate fuel cell of long life.

Figure 3:
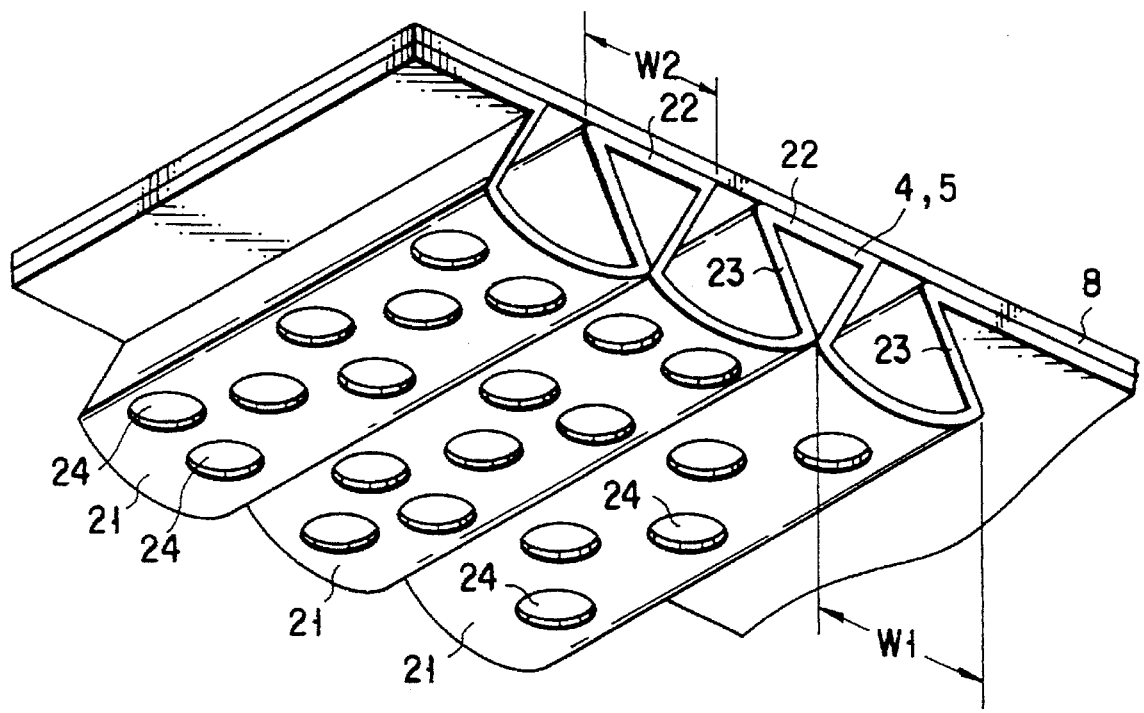
FIG. 3 is a perspective view showing another embodiment of a collector plate.

(3) The structure of a collector plate:

The corrugated collector plate 4 (or 5) comprises, as shown in FIG. 3, a plurality of wavy patterns 23 which have a first surface 21 contacting the anode 2 (or cathode 3) and a second surface 22 contacting the interconnector 8. The width ($W_1$) of the first surface 21 is broader than the width ($W_2$) of the second surface 22. The first surface 21 has a plurality of gas-feeding through holes. In addition, the first surface 21 is arcuate toward the anode 2 (or cathode 3). It is preferable to shape the wavy patterns 23 in such a manner that the both edge portions of the first surface 21 of the neighboring collector plates 4 (or 5) are contacted with each other. When the collector plates are constructed in this manner, it is possible to prevent the anode 2 (or cathode 3) from being deformed (e.g. depressed toward the collector plate) during the operation of the fuel cell.

The collector plates are formed of austenitic stainless steel or nickel-based alloy, each having excellent high temperature strength and corrosion resistance.

The stainless steel to be used for constituting the collector plate consists of 10 to 27 wt % of Cr, 7.0 to 28 wt % of Ni, not more than 0.08 wt % of Co, not more than 2.0 wt % of Mn, not more than 1.5 wt % of Si, the balance of Fe and not more than 1 wt % of unavoidable impurities. This stainless steel may contain not more than 5.5 wt % of Mo. Examples of such a stainless steel are SUS310S and SUS316L. At least a portion of the stainless steel collector plate which contacts with the electrodes is covered with the Fe-Cr-Ni alloy layer, on which a nickel-ferrite-based non-stoichiometric composite oxide layer may be further formed.

The nickel-based alloy to be used for constituting the collector plate consists of 10 to 25 wt % of Cr, 3.0 to 22 wt % of Fe, not more than 0.08 wt % of Co, not more than 2.0 wt % of Mn, not more than 1.5 wt % of Si, the balance of Ni and not more than 1 wt % of unavoidable impurities. Examples of such a nickel-based alloy include inconel 600.

The thickness of the collector plate formed of austenitic stainless steel or nickel-based alloy may preferably be in the range of 20 to 550 µm. The collector plate having such a thickness is advantageous in reducing the total weight of the fuel cell.

When the collector plate is manufactured to have a circularly expanded portions extending toward the surface of the electrodes, the height of each expanded portion should preferably be controlled to the range of 5 to 100 µm. If the height of the expanded portion is less than 5 µm, the effect of dispersing the stress can not be sufficiently attained. On the other hand, if the height of the expanded portion exceeds over 100 µm, the electrode contacting with the collector plate, i.e. anode (or cathode) may be excessively compressed whereby inhibiting a sufficient diffusion of gas and resulting in the deterioration of the performance of the fuel cell.

The width $W_1$ of first surface of the collector plate should preferably be in the range of 5 to 30 mm. If the width $W_1$ of the first surface is less than 5 mm, the molding of the collector plate may become very difficult. On the other hand, if the width $W_1$ of the first surface exceeds over 30 mm, the effect of dispersing the stress may become too weak, so that a portion of the collector plate contacting with the electrode may be detached from the electrode thereby lowering the adherence of the collector plate to the electrode.

The height of each first surface of the collector plate should preferably be in the range of 0.2 to 30 µm for each millimeter of the width.

As explained above, the collector plate is shaped into a wavy pattern such that the width ($W_1$) of the first surface contacting with the electrode is broader than a width ($W_2$) of the second surface contacting with the interconnector, and at the same time a plurality of gas-feeding through-holes are formed in the first surface of the collector plate. Furthermore, the first surface of the collector plate is arcuate toward the electrode. When the first surface of the collector plate is arcuate toward electrode in this manner, it is possible to disperse the stress between the collector plate and the electrode, and thereby to maintain the initial contact state (i.e. a contact state when the collector plate is initially fabricated into a fuel cell) between the collector plate and the electrode, even if the collector plate is subsequently deformed due to a high temperature creeping thereof as a result of the long period of operation of a fuel cell extending over 10,000 hours. As a result, it is possible to suppress an increase of electric resistance at the contacting portion between the collector plate and the electrodes, realizing a molten carbonate fuel cell of long life.

This invention will be further explained with reference to the following preferred examples as well as to FIGS. 1 to 3.

(EXAMPLE 1)

An electrolyte body formed of a porous sheet consisting mainly of $LiAlO_2$ and impregnated with a mixed alkali carbonate ($Li_2CO_3$: 62 mol %, $K_2CO_3$: 38 mol %) was interposed between the anode and cathode, both consisting of a porous body of nickel based alloy, to manufacture a unit cell.

On the other hand, an oxidizing gas-side collector plate was prepared by the following processes. Namely, a 50 µm thick alloy layer consisting of 35 wt % Fe, 25 wt % Cr and 40 wt % Ni was formed on both surfaces of a 300 µm thick SUS316L sheet by way of a cladding method, and then the resultant laminated sheet was worked to perforate a many number of gas-feeding through-holes and shaped into a corrugated sheet which was then cut into a prescribed size thereby obtaining an oxidizing gas-side collector plate.

An aluminum slurry was prepared by dispersing 70% by weight of aluminum powder having an average particle diameter of 10 µm and 70% by weight of a styrene-based binder into a ketone-based solvent, and a predetermined amount of the aluminum slurry thus obtained was coated on the surface of 0.4 mm thick stainless steel (SUS316L) sheet and dried to remove the solvent, forming a 200 µm thick aluminum-containing layer on the stainless steel sheet. The resultant stainless steel sheet was placed in a furnace filled with an argon atmosphere containing 3% of hydrogen, and then heat-treated at a temperature of 490° C. for 12 hours to remove the binder out of the aluminum-containing layer. Then, the temperature inside the furnace was raised up to 750° C. and at this temperature the stainless steel sheet was further heat-treated for 5 hours, and then cooled in the furnace at a cooling rate of 1° C./min, thereby obtaining an edge-sealing plate having a 25 µm thick corrosion resistant layer coated on the stainless steel sheet.

Subsequently, five sheets of the unit cell prepared as mentioned above were superimposed one upon another, and at the same time the oxidizing gas-side collector plate was placed on the cathode side of the unit cell. Meanwhile, a corrugated collector plate made of 300 µm thick SUS316L and provided with a many number of gas-feeding throughholes is disposed on the anode side of each unit cell. At the same time, an interconnector made of SUS316L was interposed between the neighboring collector plates, on the upper surface of the collector plate constituting the uppermost layer of the laminated body and on the bottom surface of the collector plate constituting the lowermost layer of the laminated body, respectively. Finally, the peripheral portion of each of the electrolyte bodies were clamped with the edge-sealing plate, and a spring member is disposed to the clamping portion so as to fasten the edge-sealing plate, thus fabricating the a laminated cell comprising five unit cells as shown in FIG. 1. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm$^2$ was applied to the edge-sealing plate, whereby carrying out a continuous power generation at a current density of 150 mA/cm$^2$. A power generation of 4,500 hours was performed under the condition that after every 1,000 hour of power generation, the temperature was lowered down to the room temperature. After applying four times of heat cycle to the laminated cell in this manner, the voltage of the laminated cell was measured, finding that a high voltage of 4.7 V can be obtained.

After the power generation test, the laminated cell was disassembled to measure the quantity of the electrolyte adhered onto the oxidizing gas-side collector plate. As a result, the quantity of the electrolyte adhered onto the oxidizing gas-side collector plate was found to be as little as about 0.7 mg/cm$^2$.

On the other hand, a portion of the oxidizing gas-side collector plate was cut off to analyze the section by means of EPMA. As a result, a 21 μm thick nickel-ferrite-based non-stoichiometric composite oxide layer represented by $Li_{0.4}Ni_{0.6}Fe_2O_4$ was found to have been formed on a surface of the Fe-Cr-Ni alloy layer of the collector plate.

(EXAMPLE 2)

An oxidizing gas-side collector plate was prepared by the following processes. Namely, a 70 μm thick alloy layer consisting of 40 wt % Fe, 25 wt % Cr and 35 wt % Ni was formed on both surfaces of a 300 μm thick SUS316L sheet by way of a cladding method, and then the resultant laminated sheet was worked to perforate a many number of gas-feeding through-holes and shaped into a corrugated sheet which was then cut into a prescribed size thereby obtaining an oxidizing gas-side collector plate. A laminated cell comprising five unit cells as shown in FIG. 1 was fabricated in the same manner as explained in Example 1 excepting that the oxidizing gas-side collector plate employed in Example 1 was replaced by the oxidizing gas-side collector plate of different structure as described above. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm$^2$ was applied to the edge-sealing plate, whereby carrying out a continuous power generation at a current density of 150 mA/cm$^2$. A power generation of 4,700 hours was performed under the condition that after every 1,000 hour of power generation, the temperature was lowered down to the room temperature. After applying four times of heat cycle to the laminated cell in this manner, the voltage of the laminated cell was measured, finding that a high voltage of 4.5 V can be obtained.

After the power generation test, the laminated cell was disassembled to measure the quantity of the electrolyte adhered onto the oxidizing gas-side collector plate. As a result, the quantity of the electrolyte adhered onto the oxidizing gas-side collector plate was found to be as little as about 0.6 mg/cm$^2$.

On the other hand, a portion of the oxidizing gas-side collector plate was cut off to analyze the section by means of EPMA. As a result, a 22 μm thick nickel-ferrite-based non-stoichiometric composite oxide layer represented by $Li_2NiFe_{1.5}O_4$ was found to have been formed on a surface of the Fe-Cr-Ni alloy layer of the collector plate.

(EXAMPLE 3)

An oxidizing gas-side collector plate was prepared by the following processes. Namely, a 7 μm thick alloy layer consisting of 35 wt % Fe, 25 wt % Cr and 40 wt % Ni was formed on both surfaces of a 250 μm thick SUS310S sheet by way of a cladding method, and then the resultant laminated sheet was worked to perforate a many number of gas-feeding through-holes and shaped into a corrugated sheet which was then cut into a prescribed size thereby obtaining an oxidizing gas-side collector plate. A laminated cell comprising five unit cells as shown in FIG. 1 was fabricated in the same manner as explained in Example 1 excepting that the oxidizing gas-side collector plate employed in Example 1 was replaced by the oxidizing gas-side collector plate of different structure as described above. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm$^2$ was applied to the edge-sealing plate, whereby carrying out a continuous power generation at a current density of 150 mA/cm$^2$. A power generation of 4,500 hours was performed under the condition that after every 1,000 hour of power generation, the temperature was lowered down to the room temperature. After applying four times of heat cycle to the laminated cell in this manner, the voltage of the laminated cell was measured, finding that a high voltage of 4.2 V can be obtained.

After the power generation test, the laminated cell was disassembled to measure the quantity of the electrolyte adhered onto the oxidizing gas-side collector plate. As a result, the quantity of the electrolyte adhered onto the oxidizing gas-side collector plate was found to be as little as about 0.8 mg/cm$^2$.

On the other hand, a portion of the oxidizing gas-side collector plate was cut off to analyze the section by means of EPMA. As a result, a 8 μm thick nickel-ferrite-based non-stoichiometric composite oxide layer represented by $Li_{0.4}Ni_{0.6}Fe_2O_4$ was found to have been formed on a surface of the Fe-Cr-Ni alloy layer of the collector plate.

(EXAMPLE 4)

An oxidizing gas-side collector plate was prepared by the following processes. Namely, a 100 μm thick alloy layer consisting of 35 wt % Fe, 25 wt % Cr and 40 wt % Ni was formed on both surfaces of a 250 μm thick SUS310S sheet by way of a cladding method, and then the resultant laminated sheet was worked to perforate a many number of gas-feeding through-holes and shaped into a corrugated sheet which was then cut into a prescribed size thereby obtaining an oxidizing gas-side collector plate. A laminated cell comprising five unit cells as shown in FIG. 1 was fabricated in the same manner as explained in Example 1 excepting that the oxidizing gas-side collector plate employed in Example 1 was replaced by the oxidizing gas-side collector plate of different structure as described above. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm$^2$ was applied to the edge-sealing plate, whereby carrying out a continuous power generation at a current density of 150 mA/cm$^2$. A power generation of 4,500 hours was performed under the condition that after every 1,000 hour of power generation, the temperature was lowered down to the room temperature. After applying four times of heat cycle to the laminated cell in this manner, the voltage of the laminated cell was measured, finding that a high voltage of 4.1 V can be obtained.

After the power generation test, the laminated cell was disassembled to measure the quantity of the electrolyte adhered onto the oxidizing gas-side collector plate. As a result, the quantity of the electrolyte adhered onto the oxidizing gas-side collector plate was found to be as little as about 0.8 mg/cm$^2$.

On the other hand, a portion of the oxidizing gas-side collector plate was cut off to analyze the section by means of EPMA. As a result, a 20 μm thick nickel-ferrite-based non-stoichiometric composite oxide layer represented by $Li_{0.4}Ni_{0.6}Fe_2O_4$ was found to have been formed on a surface of the Fe-Cr-Ni alloy layer of the collector plate.

(COMPARATIVE EXAMPLE 1)

A 300 μm thick SUS316L sheet was perforated to form a many number of gas-feeding through-holes and then shaped into a corrugated sheet which was then cut into a prescribed size thereby obtaining an oxidizing gas-side collector plate. A laminated cell comprising five unit cells as shown in FIG. 1 was fabricated in the same manner as explained in Example 1 excepting that the oxidizing gas-side collector plate employed in Example 1 was replaced by the oxidizing gas-side collector plate of different structure as described above. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm$^2$ was applied to the edge-sealing plate, whereby carrying out a continuous power generation at a current density of 150 mA/cm$^2$. A power generation of 3,300 hours was performed under the condition that after every 1,000 hour of power generation, the temperature was lowered down to the room temperature. After applying three times of heat cycle to the laminated cell in this manner, the voltage of the laminated cell was measured, finding that the period of power generation is much shorter as compared with Examples 1 to 4, and only a low voltage of 2.5 V was obtained in spite of fewer number of heat cycle.

After the power generation test, the laminated cell was disassembled to measure the quantity of the electrolyte adhered onto the oxidizing gas-side collector plate. As a result, the quantity of the electrolyte adhered onto the oxidizing gas-side collector plate was found to be as much as about 1.0 mg/cm$^2$ in spite of a shorter period of power generation of 3,300 hours.

On the other hand, a portion of the oxidizing gas-side collector plate was cut off to analyze the section by means of EPMA. As a result, a 40 μm thick oxide layer represented by $Li_2Fe_2O_4$ was found to have been formed on a surface of the collector plate. Accordingly, the formation of a nickel-ferrite-based non-stoichiometric composite oxide layer as indicated in Examples 1 to 4 was not recognized in this collector plate of this Comparative Example 1.

(COMPARATIVE EXAMPLE 2)

An oxidizing gas-side collector plate was prepared by the following processes. Namely, a 50 μm thick nickel layer was formed on both surfaces of a 300 μm thick SUS316L sheet by way of a cladding method, and then the resultant laminated sheet was worked to perforate a many number of gas-feeding through-holes and shaped into a corrugated sheet which was then cut into a prescribed size thereby obtaining an oxidizing gas-side collector plate. A laminated cell comprising five unit cells as shown in FIG. 1 was fabricated in the same manner as explained in Example 1 excepting that the oxidizing gas-side collector plate employed in Example 1 was replaced by the oxidizing gas-side collector plate of different structure as described above. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm$^2$ was applied to the edge-sealing plate, whereby carrying out a continuous power generation at a current density of 150 mA/cm$^2$. A power generation of 3,500 hours was performed under the condition that after every 1,000 hour of power generation, the temperature was lowered down to the room temperature.

After applying three times of heat cycle to the laminated cell in this manner, the voltage of the laminated cell was measured, finding that the period of power generation is much shorter as compared with Examples 1 to 4, and only a low voltage of 3.0 V was obtained in spite of fewer number of heat cycle.

After the power generation test, the laminated cell was disassembled to measure the quantity of the electrolyte adhered onto the oxidizing gas-side collector plate. As a result, the quantity of the electrolyte adhered onto the oxidizing gas-side collector plate was found to be as much as about 2.1 mg/cm$^2$ in spite of a shorter period of power generation of 3,500 hours.

On the other hand, a portion of the oxidizing gas-side collector plate was cut off to analyze the section by means of EPMA. As a result, a 55 μm thick oxide layer represented by NiO was found to have been formed on a surface of the collector plate. Accordingly, the formation of a nickel-ferrite-based non-stoichiometric composite oxide layer as indicated in Examples 1 to 4 was not recognized in this collector plate of this Comparative Example 2.

(COMPARATIVE EXAMPLE 3)

An oxidizing gas-side collector plate was prepared by the following processes. Namely, a 70 μm thick alloy layer consisting of 50 wt % Fe, 20 wt % Cr and 30 wt % Ni was formed on both surfaces of a 300 μm thick SUS316L sheet by way of a cladding method, and then the resultant laminated sheet was worked to perforate a many number of gas-feeding through-holes and shaped into a corrugated sheet which was then cut into a prescribed size thereby obtaining an oxidizing gas-side collector plate. A laminated cell comprising five unit cells as shown in FIG. 1 was fabricated in the same manner as explained in Example 1 excepting that the oxidizing gas-side collector plate employed in Example 1 was replaced by the oxidizing gas-side collector plate of different structure as described above. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm$^2$ was applied to the edge-sealing plate, whereby carrying out a continuous power generation at a current density of 150 mA/cm$^2$. A power generation of 4,300 hours was performed under the condition that after every 1,000 hour of power generation, the temperature was lowered down to the room temperature. After applying four times of heat cycle to the laminated cell in this manner, the voltage of the laminated cell was measured, finding that the period of power generation is much shorter as compared with Examples 1 to 4, and only a low voltage of 3.5 V was obtained.

After the power generation test, the laminated cell was disassembled to measure the quantity of the electrolyte adhered onto the oxidizing gas-side collector plate. As a result, the quantity of the electrolyte adhered onto the oxidizing gas-side collector plate was found to be about 0.8 mg/cm$^2$.

On the other hand, a portion of the oxidizing gas-side collector plate was cut off to analyze the section by means of EPMA. As a result, a 45 μm thick oxide layer represented by $LiFe_2O_4$ was found to have been formed on a surface of the Fe-Cr-Ni alloy layer of the collector plate. Accordingly, the formation of a nickel-ferrite-based non-stoichiometric composite oxide layer as indicated in Examples 1 to 4 was not recognized in this collector plate of this Comparative Example 3 due presumably to a larger content of Fe in the Fe-Cr-Ni alloy layer in this Comparative Example 3 as compared with the range (23 to 45 wt %) of this invention.

(COMPARATIVE EXAMPLE 4)

An oxidizing gas-side collector plate was prepared by the following processes. Namely, a 70 μm thick alloy layer consisting of 15 wt % Fe, 15 wt % Cr and 70 wt % Ni was formed on both surfaces of a 300 μm thick SUS316L sheet by way of a cladding method, and then the resultant laminated sheet was worked to perforate a many number of gas-feeding through-holes and shaped into a corrugated sheet which was then cut into a prescribed size thereby obtaining an oxidizing gas-side collector plate. A laminated cell comprising five unit cells as shown in FIG. 1 was fabricated in the same manner as explained in Example 1 excepting that the oxidizing gas-side collector plate employed in Example 1 was replaced by the oxidizing gas-side collector plate of different structure as described above. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm$^2$ was applied to the edge-sealing plate, whereby carrying out a continuous power generation at a current density of 150 mA/cm$^2$. A power generation of 4,500 hours was performed under the condition that after every 1,000 hour of power generation, the temperature was lowered down to the room temperature. After applying four times of heat cycle to the laminated cell in this manner, the voltage of the laminated cell was measured, finding that the period of power generation is much shorter as compared with Examples 1 to 4, and only a low voltage of 3.7 V was obtained.

After the power generation test, the laminated cell was disassembled to measure the quantity of the electrolyte adhered onto the oxidizing gas-side collector plate. As a result, the quantity of the electrolyte adhered onto the oxidizing gas-side collector plate was found to be about 1.7 mg/cm$^2$.

On the other hand, a portion of the oxidizing gas-side collector plate was cut off to analyze the section by means of EPMA. As a result, a 75 μm thick oxide layer represented by NiO was found to have been formed on a surface of the Fe-Cr-Ni alloy layer of the collector plate. Accordingly, the formation of a nickel-ferrite-based non-stoichiometric composite oxide layer as indicated in Examples 1 to 4 was not recognized in this collector plate of this Comparative Example 4 due presumably to a smaller content of Fe in the Fe-Cr-Ni alloy layer in this Comparative Example 4 as compared with the range (23 to 45 wt %) of this invention.

17

(EXAMPLE 5)

An electrolyte body formed of a porous sheet consisting mainly of $LiAlO_2$ and impregnated with a mixed alkali carbonate ($Li_2CO_3$: 62 mol %, $K_2CO_3$: 38 mol %) was interposed between the anode and cathode, both consisting of a porous body of nickel based alloy, to manufacture a unit cell.

On the other hand, a collector plate was prepared by the following processes. Namely, a 300 µm thick SUS316L sheet was worked to perforate a many number of gas-feeding through-holes and shaped into a corrugated sheet which was then cut into a prescribed size thereby obtaining an oxidizing gas-side collector plate.

An aluminum slurry was prepared by dispersing 70% by weight of aluminum powder having an average particle diameter of 10 µm and 70% by weight of a styrene-based binder into a ketone-based solvent, and a predetermined amount of the aluminum slurry thus obtained was coated on the surface of 0.4 mm thick stainless steel (SUS316L) sheet and dried to remove the solvent, forming a 200 µm thick aluminum-containing layer on the stainless steel sheet. The resultant stainless steel sheet was placed in a furnace filled with an argon atmosphere containing 3% of hydrogen, and then heat-treated at a temperature of 490° C. for 12 hours to remove the binder out of the aluminum-containing layer. Then, the temperature inside the furnace was raised up to 750° C. and at this temperature the stainless steel sheet was further heat-treated for 5 hours, and then cooled in the furnace at a cooling rate of 1° C./min, thereby obtaining an edge-sealing plate having a 25 µm thick corrosion resistant layer coated on the stainless steel sheet.

Subsequently, five sheets of the unit cell prepared as mentioned above were superimposed one upon another, and at the same time the collector plate was disposed on the cathode side and anode side of the unit cell, respectively. At the same time, an interconnector made of SUS310S was disposed between the neighboring collector plates, on the upper surface of the collector plate constituting the uppermost layer of the laminated body and on the bottom surface of the collector plate constituting the lowermost layer of the laminated body, respectively. Finally, the peripheral portion of each of the electrolyte bodies were clamped with the edge-sealing plate, and a spring member is disposed to the clamping portion so as to fasten the edge-sealing plate, thus assembling the a laminated cell comprising five unit cells as shown in FIG. 1. In this case, each collector plate disposed on the cathode, i.e., each oxidizing gas-side collector plate was contacted at portions a flat surface of the interconnector, each of the portion having curved surfaces at ends. A gold solder was placed at spaces formed between the flat surface of the interconnector and the curved surfaces of each portion of the collector plate. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm$^2$ was applied to the edge-sealing plate, whereby carrying out a continuous power generation at a current density of 150 mA/cm$^2$. A power generation of 1,000 hours was performed under the condition that after every 400 hour of power generation, the temperature was lowered down to the room temperature, thus applying two times of heat cycle to the laminated cell in this manner. The internal voltage of the laminated cell during this heat cycle was measured, the results being shown in Table 1.

(EXAMPLE 6)

A corrugated oxidizing gas-side collector plate was contacted at portions a flat surface of an interconnector, each portion having curved surfaces at ends. Al-Si solder wire was placed at spaces formed between the flat surface of the interconnector and the curved surfaces of each portion of the collector plate. In this case, the collector plate was made of SUS310S and had 300 µm thickness. In addition, the interconnector was made of SUS310S. A laminated cell comprising five unit cells as shown in FIG. 1 was fabricated in the same manner as explained in Example 5 excepting that the collector plate and the interconnector employed in Example 5 was replaced by the collector plate and the interconnector of different structure as described above. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm$^2$ was applied to the edge-sealing plate, whereby carrying out a continuous power generation at a current density of 150 mA/cm$^2$. A power generation of 1,000 hours was performed under the condition that after every 400 hour of power generation, the temperature was lowered down to the room temperature, thus applying two times of heat cycle to the laminated cell in this manner. The internal voltage of the laminated cell during this heat cycle was measured, the results being shown in Table 1.

(EXAMPLE 7)

A corrugated oxidizing gas-side collector plate was contacted at portions a flat surface of an interconnector, each portion having curved surfaces at ends. Silver solder wire was placed at spaces formed between the flat surface of the interconnector and the curved surfaces of each portion of the collector plate. In this case, the collector plate was made of SUS310S and had 300 µm thickness. In addition, the interconnector was made of SUS310S. A laminated cell comprising five unit cells as shown in FIG. 1 was fabricated in the same manner as explained in Example 5 excepting that the collector plate and the interconnector employed in Example 5 was replaced by the collector plate and the interconnector of different structure as described above. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm² was applied to the edge-sealing plate, whereby carrying out a continuous power generation at a current density of 150 mA/cm². A power generation of 1,000 hours was performed under the condition that after every 400 hour of power generation, the temperature was lowered down to the room temperature, thus applying two times of heat cycle to the laminated cell in this manner. The internal voltage of the laminated cell during this heat cycle was measured, the results being shown in Table 1.

(EXAMPLE 8)

A corrugated oxidizing gas-side collector plate was contacted at portions a flat surface of an interconnector, each portion having curved surfaces at ends. ZnO—$B_2O_3$ (a low melting point glass) powder was placed at spaces formed between the flat surface of the interconnector and the curved surfaces of each portion of the collector plate. In this case, the collector plate was made of SUS310S and had 300 μm thickness. In addition, the interconnector was made of SUS310S. A laminated cell comprising five unit cells as shown in FIG. 1 was fabricated in the same manner as explained in Example 5 excepting that the collector plate and the interconnector employed in Example 5 was replaced by the collector plate and the interconnector of different structure as described above. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm² was applied to the edge-sealing plate, whereby carrying out a continuous power generation at a current density of 150 mA/cm². A power generation of 1,000 hours was performed under the condition that after every 400 hour of power generation, the temperature was lowered down to the room temperature, thus applying two times of heat cycle to the laminated cell in this manner. The internal voltage of the laminated cell during this heat cycle was measured, the results being shown in Table 1.

(EXAMPLE 9)

A corrugated oxidizing gas-side collector plate was contacted at portions a flat surface of an interconnector, each portion having curved surfaces at ends. Gold solder wire was placed at spaces formed between the flat surface of the interconnector and the curved surfaces of each portion of the collector plate. In this case, the collector plate was made of SUS310S and had 300 μm thickness. In addition, the interconnector was made of SUS310S. Then, a bearing pressure of 2 kg/cm² was applied to the solder wire at a place outside the unit cell and heat-treated for 10 minutes at a temperature of 910° C. thereby filling the molten solder wire into the spaces. Then, a laminated cell comprising five unit cells as shown in FIG. 1 was fabricated in the same manner as explained in Example 5 excepting that the collector plate and the interconnector employed in Example 5 was replaced by the collector plate and the interconnector of different structure as described above. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm² was applied to the edge-sealing plate, whereby carrying out a continuous power generation at a current density of 150 mA/cm². A power generation of 1,000 hours was performed under the condition that after every 400 hour of power generation, the temperature was lowered down to the room temperature, thus applying two times of heat cycle to the laminated cell in this manner. The internal voltage of the laminated cell during this heat cycle was measured, the results being shown in Table 1.

(EXAMPLE 10)

A corrugated oxidizing gas-side collector plate was contacted at portions a flat surface of an interconnector, each portion having curved surfaces at ends. Palladium solder wire was placed at spaces formed between the flat surface of the interconnector and the curved surfaces of each portion of the collector plate. In this case, the collector plate was made of SUS310S and had 300 μm thickness. In addition, the interconnector was made of SUS310S. Then, a bearing pressure of 2 kg/cm² was applied to the solder wire at a place outside the unit cell and heat-treated for 10 minutes at a temperature of 910° C. thereby filling the molten solder wire into the spaces. Then, a laminated cell comprising five unit cells as shown in FIG. 1 was fabricated in the same manner as explained in Example 5 excepting that the collector plate and the interconnector employed in Example 5 was replaced by the collector plate and the interconnector of different structure as described above. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm² was applied to the edge-sealing plate, whereby carrying out a continuous power generation at a current density of 150 mA/cm². A power generation of 1,000 hours was performed under the condition that after every 400 hour of power generation, the temperature was lowered down to the room temperature, thus applying two times of heat cycle to the laminated cell in this manner. The internal voltage of the laminated cell during this heat cycle was measured, the results being shown in Table 1.

(COMPARATIVE EXAMPLE 6)

A laminated cell comprising five unit cells as shown in FIG. 1 was fabricated in the same manner as explained in Example 5 excepting that an oxidizing gas-side collector plate formed of a 300 μm thick SUS310S corrugated sheet and an interconnector made of SUS310S were simply superimposed one upon another. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm² was applied to the edge-sealing plate, whereby carrying out a continuous power generation at a current density of 150 mA/cm². A power generation of 1,000 hours was performed under the condition that after every 400 hour of power generation, the temperature was lowered down to the room temperature, thus applying two times of heat cycle to the laminated cell in this manner. The internal voltage of the laminated cell during this heat cycle was measured, the results being shown in Table 1.

(COMPARATIVE EXAMPLE 7)

An oxidizing gas-side collector plate formed of a 300 μm thick SUS310S corrugated sheet and an interconnector made of SUS310S were superimposed one upon another, and gold solder wire was inserted into a gap formed at the contacting portion between the convex surface of the collector plate and the flat surface of the interconnector. The brazing with this gold solder wire was performed in a furnace at a temperature of 910° C. Then, a laminated cell comprising five unit cells as shown in FIG. 1 was fabricated in the same manner as explained in Example 5 excepting that the collector plate and the interconnector as described above were employed in this Comparative Example 7. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm² was applied to the edge-sealing plate, whereby carrying out a continuous power generation at a current density of 150 mA/cm². A power generation of 1,000 hours was performed under the condition that after every 400 hour of power generation, the temperature was lowered down to the room temperature, thus applying two times of heat cycle to the laminated cell in this manner. The internal voltage of the laminated cell during this heat cycle was measured, the results being shown in Table 1.

(COMPARATIVE EXAMPLE 8)

An oxidizing gas-side collector plate formed of a 300 μm thick SUS310S corrugated sheet and an interconnector made of SUS310S were superimposed one upon another, and Ni solder foil was inserted into a gap formed at the contacting portion between the convex surface of the collector plate and the flat surface of the interconnector and brazed in a furnace at a temperature of 1,000° C. Then, a laminated cell comprising five unit cells as shown in FIG. 1 was fabricated in the same manner as explained in Example 5 excepting that the collector plate and the interconnector fabricated as described above were employed in this Comparative Example 8. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas ($H_2$) was fed to the passage surrounded by the anode and the collector plate, and at the same time an oxidizer gas (air or $CO_2$) was fed to the passage surrounded by the cathode and the collector plate thereby raising the temperature up to 650° C. or the power generation temperature, thereby generating an electric power. On the other hand, a bearing pressure of 3 kg/cm² was applied to the edge-sealing plate, whereby carrying out a continuous power generation at a current density of 150 mA/cm². A power generation of 1,000 hours was performed under the condition that after every 400 hour of power generation, the temperature was lowered down to the room temperature, thus applying two times of heat cycle to the laminated cell in this manner. The internal voltage of the laminated cell during this heat cycle was measured, the results being shown in Table 1.

TABLE 1

| | Barrier | Increase in internal resistance mΩ · cm² |
| --- | --- | --- |
| Example 5 | Gold solder | 9 |
| Example 6 | Al-Si solder | 13 |
| Example 7 | Silver solder | 14 |
| Example 8 | $ZnO-B_2O_3$ | 16 |
| Example 9 | Gold solder | 26 |
| Example 10 | Palladium solder | 28 |
| Comparative Example 6 | Non | 112 |
| Comparative Example 7 | Non* | 63 |
| Comparative Example 8 | Non** | 96 |

*: Brazed with a gold solder at the contacting portion between the collector plate and the interconnector.
**: Brazed with a Ni solder at the contacting portion between the collector plate and the interconnector.

As apparent from the Table 1, in the case of the fuel cells according to Examples 5 to 10, the increase of electric resistance after an operation of 1,000 hours including two heat cycles was confined to a magnitude of 30 mΩ·cm² or less. In particular, in the case of the fuel cells according to Examples 5 to 8 wherein the melting point of the barrier was lower than the operation temperature of the fuel cell, the increase of electric resistance was confined to a magnitude of 20 mΩ·cm² or less, indicating that the increase of internal resistance of a fuel cell can be fully suppressed.

By contrast, in the case of the fuel cells according to Comparative Examples 6 to 8, the increase of electric resistance after an operation of 1,000 hours including two heat cycles was as large as 60 mΩ·cm² or more, indicating prominent deterioration of the performance of the fuel cell.

(EXAMPLE 11)

An electrolyte body formed of a porous sheet consisting mainly of $LiAlO_2$ and impregnated with a mixed alkali carbonate (Li$_2$CO$_3$: 62 mol %, K$_2$CO$_3$: 38 mol %) was interposed between the anode and cathode, both consisting of a porous body of nickel based alloy, to manufacture a unit cell.

An oxidizing gas-side collector plate was prepared by the following processes. Namely, a 50 μm thick alloy layer consisting of 35 wt % Fe, 25 wt % Cr and 40 wt % Ni was formed on one of the surfaces of a 250 μm thick SUS310S sheet by way of a cladding method, and then the resultant laminated sheet was worked to perforate a many number of gas-feeding through-holes and shaped into a corrugated sheet which was then cut into a prescribed size thereby obtaining an oxidizing gas-side collector plate as shown in FIG. 3. The collector plate thus obtained was used in such a manner that the main surface where the alloy layer was coated (the electrode side surface) was directed to contact with the cathode. This collector plate was shaped, as shown in FIG. 3, to have a plurality of wavy patterns 23 which had a first surface 21 contacting the cathode 3 and a second surface 22 contacting the interconnector 8. The width (W$_1$) of the first surface 21 was broader than the width (W$_2$) of the second surface 22 and had a plurality of gas-feeding through holes. In addition, the first surface 21 was arcuate toward the cathode 3. The height of the arcuate portion of the first surface 21 was set to 50 μm, and the width (W$_1$) of the first surface 21 was set to 15 mm.

An aluminum slurry was prepared by dispersing 70% by weight of aluminum powder having an average particle diameter of 10 μm and 70% by weight of a styrene-based binder into a ketone-based solvent, and a predetermined amount of the aluminum slurry thus obtained was coated on the surface of 0.4 mm thick stainless steel (SUS316L) sheet and dried to remove the solvent, forming a 200 μm thick aluminum-containing layer on the stainless steel sheet. The resultant stainless steel sheet was placed in a furnace filled with an argon atmosphere containing 3% of hydrogen, and then heat-treated at a temperature of 490° C. for 12 hours to remove the binder out of the aluminum-containing layer. Then, the temperature inside the furnace was increased up to 750° C. and at this temperature the stainless steel sheet was further heat-treated for 5 hours, and then cooled in the furnace at a cooling rate of 1° C./min, thereby obtaining an edge-sealing plate having a 25 μm thick corrosion resistant layer coated on the stainless steel sheet.

Subsequently, five sheets of the unit cell prepared as mentioned above were superimposed one upon another, and at the same time the collector plate was disposed on the cathode side of the unit cell. Then, a corrugated collector plate made of 300 μm thick Inconel 600 and formed a many number of gas-feeding through-holes is disposed on the anode side of each unit cell. At the same time, an interconnector made of SUS316L was disposed between the neighboring collector plates, on the upper surface of the collector plate constituting the uppermost layer of the laminated body and on the bottom surface of the collector plate constituting the lowermost layer of the laminated body, respectively. Finally, the peripheral portion of each of the electrolyte bodies were clamped with the edge-sealing plate, and a spring member is disposed to the clamping portion so as to fasten the edge-sealing plate, thus assembling the a laminated cell comprising five unit cells as shown in FIG. 1. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas (H$_2$) was fed to the passage surrounded by the anode and the collector plate, and at the same time an oxidizer gas (air or CO$_2$) was fed to the passage surrounded by the cathode and the collector plate thereby raising the temperature up to 650° C. or the power generation temperature, thereby generating an electric power. On the other hand, a bearing pressure of 3 kg/cm$^2$ was applied to the edge-sealing plate, whereby carrying out a power generation at a current density of 150 mA/cm$^2$. As a result, an output of 4.7 V was obtained when the fuel cell was continuously operated for a period of 15,000 hours.

(COMPARATIVE EXAMPLE 9)

An oxidizing gas-side collector plate was prepared by perforating a many number of gas-feeding through-holes in a 250 μm thick SUS310S sheet, shaping it into a corrugated sheet, and then cutting it into a prescribed size. The collector plate thus obtained was used in such a manner that the main surface where the alloy layer was coated (the electrode side surface) was directed to contact with the cathode. This collector plate was shaped to have a plurality of wavy patterns which had a first surface contacting the cathode and a second surface contacting the interconnector. The width of the first surface was broader than the width of the second surface. In addition, the first surface was flat and formed a plurality of gas-feeding through holes. A laminated cell as shown in FIG. 1 was fabricated in the same manner as explained in Example 11 excepting that the oxidizing gas-side collector plate obtained as described above was employed. Subsequently, the laminated cell was placed in a power-generating apparatus.

A gas consisting of 50% by volume of carbon dioxide gas and the balance of nitrogen was passed as a purge gas into the power-generating apparatus mounted with the above-mentioned laminated cell. Subsequently, according to the ordinary temperature-raising procedure of a fuel cell, a fuel gas (H$_2$) was fed to the passage surrounded by the anode and the collector plate, and at the same time an oxidizer gas (air or CO$_2$) was fed to the passage surrounded by the cathode and the collector plate thereby raising the temperature up to 650° C. or the power generation temperature, thereby generating an electric power. On the other hand, a bearing pressure of 3 kg/cm$^2$ was applied to the edge-sealing plate, whereby carrying out a power generation at a current density of 150 mA/cm$^2$. As a result, an output of as low as 2.0 V was obtained when the fuel cell was continuously operated for a period of 14,000 hours.

As explained above, it is possible according to this invention to provide a molten carbonate fuel cell of high performance and long life, whose oxidizing gas side-collector plate is provided on its surface with a non-stoichiometric composite oxide layer which is excellent in electric conductivity and corrosion resistance, and hardly attracts electrolyte. As a result, the collector plate can be hardly peeled off from a cathode even if the collector plate is subjected to a repeated heat cycle of raising or lowering the temperature of collector plate.

Further, it is possible according to this invention to provide a molten carbonate fuel cell of long life which is capable of preventing the corrosion of a contacting portion between the oxidizing gas side-collector plate and an interconnector, and also capable of maintaining the contact area between the collector plate and the interconnector in the initial condition (at the moment when the they are fabricated in a fuel cell), thereby making it possible to suppress any increase in electric resistance between the collector plate and the interconnector.

Furthermore, it is possible according to this invention to provide a molten carbonate fuel cell provided with a collector plate which can be hardly peeled off from an electrode even if the collector plate is operated for a long period of time extending over 10,000 hours.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A molten carbonate fuel cell which comprises;

a unit cell comprising an electrolyte body formed of a porous body impregnated therein with a carbonate, a cathode disposed on one main surface of said electrolyte body, and an anode disposed on the other main surface of said electrolyte body;

corrugated collector plates, disposed alternatively on a surface of said anode and on a surface of said cathode; and interconnectors, each being disposed on a surface of each of said collector plates;

wherein said collector plate disposed on the cathode comprises a main body made of austenitic stainless steel; an Fe-Cr-Ni alloy layer covering a surface of said main body and consisting of 23 to 45 wt % of Fe, 12 to 27 wt % of Cr, the balance of Ni and not more than 1 wt % of unavoidable impurities; and a nickel-ferrite-based non-stoichiometric composite oxide layer formed on a surface of said Fe-Cr-Ni alloy layer.

2. The fuel cell according to claim 1, wherein said main body has a thickness of 200 to 400 μm.

3. The fuel cell according to claim 1, wherein said Fe-Cr-Ni alloy layer contains 28 to 42% by weight of Fe.

4. The fuel cell according to claim 1, wherein said Fe-Cr-Ni alloy layer contains 9 to 27% by weight of Cr.

5. The fuel cell according to claim 1, wherein said Fe-Cr-Ni alloy layer has a thickness of 5 to 150 μm.

6. The fuel cell according to claim 1, wherein said nickel-ferrite-based non-stoichiometric composite oxide layer is of spinel structure.

7. The fuel cell according to claim 1, wherein said nickel-ferrite-based non-stoichiometric composite oxide layer is represented by $Ni_{1-x}Fe_{2-y}O_4$, wherein x is in the range of $0<x<0.85$, y is in the range of $-0.5<y<1.0$ and x+y is in the range of $0<x+y$.

8. The fuel cell according to claim 1, wherein said nickel-ferrite-based non-stoichiometric composite oxide layer comprises a composite oxide layer containing Fe and Cr which are formed on a surface of said alloy layer, and another composite oxide layer wherein the amounts of Ni and Fe are insufficient for the amount of oxygen as compared with a composite oxide material having the stoichiometric composition of $NiFe_2O_4$.

9. The fuel cell according to claim 1, wherein said nickel-ferrite-based non-stoichiometric composite oxide layer is interpenetrated or substituted by lithium.

10. The fuel cell according to claim 1, wherein said carbonate is a mixed carbonate comprising lithium carbonate, potassium carbonate and/or sodium carbonate.

11. A molten carbonate fuel cell which comprises;

a unit cell comprising an electrolyte body formed of a porous body impregnated with a carbonate, an air electrode disposed on one main surface of said electrolyte body, and a fuel electrode disposed on the other main surface of said electrolyte body;

corrugated collector plates, disposed respectively on a surface of said fuel electrode and a surface of said air electrode, wherein said corrugations have curved surfaces; and interconnectors disposed on surfaces of said collector plates respectively;

wherein each corrugation of said collector plates contacts a flat surface of one of said interconnectors and barriers are provided in spaces formed between the flat surface of the interconnector and said curved surfaces of said collector plate.

12. The fuel cell according to claim 11, wherein said barriers are made of a conductive material having a melting point lower than an operating temperature of the fuel cell.

13. The fuel cell according to claim 12, wherein said conductive material is an aluminum solder.

14. The fuel cell according to claim 11, wherein said barriers are made of a conductive material having a melting point lower than a melting temperature of said electrolyte body.

15. The fuel cell according to claim 14, wherein said conductive material is a gold solder.

16. The fuel cell according to claim 11, wherein said barriers are made of a low melting point glass.

17. The fuel cell according to claim 16, wherein said low melting point glass is $ZnO$—$B_2O_3$.

18. A molten carbonate fuel cell which comprises;

a unit cell comprising an electrolyte body formed of a porous body impregnated therein with a carbonate, and a pair of electrodes disposed respectively on the both main surfaces of said electrolyte body;

corrugated collector plates disposed respectively on both surfaces of said cathode; and interconnectors, each being disposed on a surface of each of said collector plates;

wherein each of said corrugated collector plates has a first surface contacting said electrode and a second surface contacting said interconnector, said first surface is broader than said second surface, has a plurality of gas-feeding through holes and is arcuate toward said electrode.

19. The fuel cell according to claim 18, wherein said first surface of said collector plate is arcuate toward said electrode at a height of 5 to 100 μm.

20. The fuel cell according to claim 18, wherein said first surface of said collector plate has a width of 5 to 30 mm.

21. The fuel cell according to claim 18, wherein the height of said first surface of said collector plate is the range of 0.2 to 30 μm for millimeter of the width.

* * * * *